US012760879B2

(12) United States Patent
He

(10) Patent No.: US 12,760,879 B2
(45) **Date of Patent: *Oct. 13, 2026**

(54) LED STRING LIGHT WITH BRANCH-TRUNK STRUCTURE

(71) Applicant: SHANGYOU JIAYI LIGHTING PRODUCT CO., LTD., Shangyou City (CN)

(72) Inventor: Yaowen He, Shangyou City (CN)

(73) Assignee: SHANGYOU JIAYI LIGHTING PRODUCT CO., LTD., Shangyou City (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/338,666

(22) Filed: Sep. 24, 2025

(65) Prior Publication Data

US 2026/0218889 A1 Jul. 30, 2026

Related U.S. Application Data

(63) Continuation of application No. 19/072,766, filed on Mar. 6, 2025, now Pat. No. 12,460,806.

(30) Foreign Application Priority Data

Jan. 24, 2025 (CN) ......................... 202520167179.3

(51) Int. Cl.
*F21S 4/10* (2016.01)
*F21K 9/66* (2016.01)
(Continued)

(52) U.S. Cl.
CPC .............. *F21V 23/001* (2013.01); *F21K 9/66* (2016.08); *F21S 4/10* (2016.01); *F21V 23/008* (2013.01);
(Continued)

(58) Field of Classification Search
CPC ..................................................... F21V 23/001
See application file for complete search history.

(56) References Cited

U.S. PATENT DOCUMENTS 11,692,679 B1 * 7/2023 Yang ......................... F21S 4/10 362/217.01
2006/0062020 A1 * 3/2006 Kuo ....................... H01R 33/09 362/654

(Continued)

FOREIGN PATENT DOCUMENTS

| | | | | |
|---|---|---|---|---|
| CN | 101225931 A | * | 7/2008 | .............. F21V 23/00 |
| JP | 2002260884 A | * | 9/2002 | ................ F21S 4/10 |
| WO | WO-2010102556 A1 | * | 9/2010 | ................ F21S 4/10 |

*Primary Examiner* — Zheng Song
(74) *Attorney, Agent, or Firm* — AVEK IP, LLC

(57) ABSTRACT

Some embodiments of the disclosure relate to the technical field of lights and disclose an LED string light with a branch-trunk structure, including a power supply assembly and multiple wire groups. A light source assembly is arranged between every two wire groups, and an end of the first wire group is electrically connected to the power supply assembly; every two wire groups are at least partially bent and combined to form a branch-trunk structure used for supporting the light source assembly. The disclosure may have the following advantages: 1, the string light in this technical solution is small in overall size, low in weight, easier to install and low in installation difficulty; 2, the light is mainly formed by columnar transparent light beads, such that the internal structure of the light is effectively simplified, and the use cost of the string light is reduced.

9 Claims, 8 Drawing Sheets

(51) Int. Cl.
*F21V 23/00* (2015.01)
*F21V 23/02* (2006.01)
*F21V 23/04* (2006.01)
*F21V 23/06* (2006.01)
*F21Y 115/10* (2016.01)

(52) U.S. Cl.
CPC .............. *F21V 23/02* (2013.01); *F21V 23/04* (2013.01); *F21V 23/06* (2013.01); *F21Y 2115/10* (2016.08)

(56) References Cited

U.S. PATENT DOCUMENTS

2017/0284614 A1* 10/2017 Pan ........................ F21V 23/001
2019/0368705 A1* 12/2019 Han ........................ F21V 23/001

* cited by examiner

LED STRING LIGHT WITH BRANCH-TRUNK STRUCTURE

BACKGROUND

1. Technical Field

The disclosure relates to the technical field of lights, in particular to an LED string light with a branch-trunk structure.

2. Description of Related Art

In holidays, festivals, family parties or other recreational parties, a great many of decorative string lights are often arranged in the gathering place by organizers to better set off the atmosphere and create a relaxed and festive atmosphere by means of light and color distribution of the decorative string lights.

A string light wire of an existing decorative string light is formed by four or more wires, thus having a complex structure and a relatively high use cost; in addition, the string light wire makes the string light large in size and weight and poor in aesthetics and decorative effect. No matter whether the string light is used for indoor or outdoor decoration, it is difficult to install, likely to fall from above and inconvenient to use. Therefore, the inventor makes a further improvement on existing lights to solve these problems.

SUMMARY

In view of the defects in the prior art, the goal of the disclosure is to provide an LED string light with a branch-trunk structure, which is aesthetic and simple in structure.

To fulfill the above goal, the LED string light with a branch-trunk structure provided by the disclosure includes a power supply assembly and multiple wire groups. A light source assembly is arranged between every two wire groups, and an end of the first wire group is electrically connected to the power supply assembly; every two wire groups are at least partially bent and combined to form a branch-trunk structure used for supporting the light source assembly; the LED string light further includes an insulating sleeve, and at least part of the insulating sleeve is disposed around the branch-trunk structure; the light source assembly includes a columnar transparent light bead, a first pin, a second pin and an LED light source packaged in the columnar transparent light bead, and the first pin and the second pin are arranged at a same end of the columnar transparent light bead and electrically connected to the LED light source; each wire group is at least provided with a wire a and a wire b which are arranged abreast, the wire a and the wire b are provided with insulating protection layers, at least one end of the wire a is connected to the first pin, and at least one end of the wire b is connected to the second pin.

Optionally, a part of the insulating sleeve is disposed around a bottom of the columnar transparent light bead.

Optionally, the LED string light with a branch-trunk structure further includes a support member. The support member is mounted between the first pin and the second pin.

Optionally, a recess is formed in a bottom end of the columnar transparent light bead, and a top end of the support member is mounted in the recess.

Optionally, a support member is arranged on the columnar transparent light bead, and the support member and the columnar transparent light bead are formed integrally.

Optionally, the wire a and the wire b are intertwisted to form a strand.

Optionally, the LED string light with a branch-trunk structure further includes a controller. The controller is arranged between the power supply assembly and the guide groups.

Optionally, the controller includes a shell, a USB interface and a PCB, and the PCB is arranged inside the shell; the USB interface is arranged at one end of the shell and electrically connected to the PCB; the controller is pluggably connected to the power supply assembly by means of the USB interface.

Optionally, a first transmission line and a second transmission line extending outwards are arranged at the other end, away from the USB interface, of the shell; one end of the first transmission line and one end of the second transmission line are electrically connected to the PCB, the other end of the first transmission line is electrically connected to the wire a, and the other end of the second transmission line is electrically connected to the wire b; a control button is arranged on the shell.

Optionally, insulation tubes are disposed around the first transmission line and the second transmission line.

Compared with the prior art, the LED string light with a branch-trunk structure may have one or more of the following effects.

1. The structure of the string light wire of existing string lights is improved, such that the number of wires of the string light is reduced, thus simplifying the structure of the string light, reducing the size and weight of the string light, and improving the decoration effect of the string light;
2. The string light in the technical solution is small in overall size, low in weight, easier to install and low in manufacturing cost;
3. The string light wire is formed by intertwining two wires which are arranged abreast, and many branches are arranged to form a tree shape, such that the string light is novel in overall structure;
4. The string light is provided with the controller, such that intelligent control of the string light, such as color alternation and switching and on-position switching, may be realized.

Figure 1:
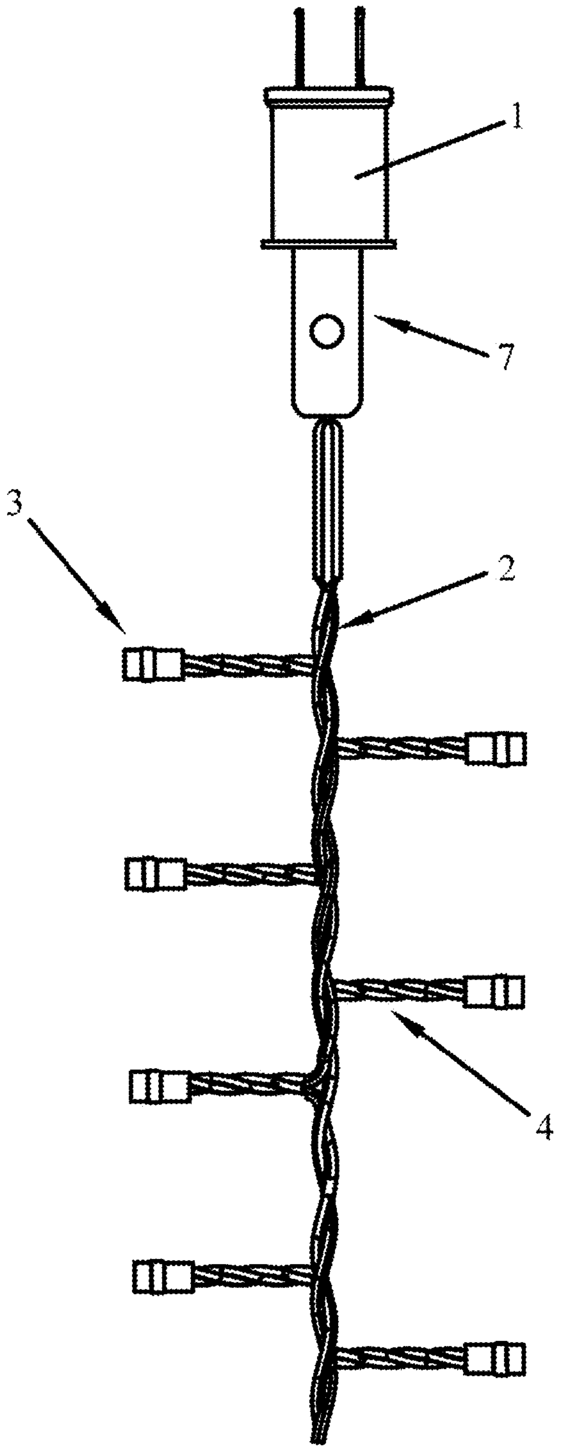
FIG. 1 is an overall structural view of a string light according to the disclosure.

Reference signs: 1, power supply assembly; 2, wire group; 21, wire a; 22, wire b; 23, insulating protection layer; 3, light source assembly; 31, columnar transparent light bead; 32, first pin; 33, second pin; 34, recess; 35, LED light source; 4, branch-trunk structure; 5, insulating sleeve; 6, support member; 61, receiving groove; 7, controller; 71, shell; 72, USB interface; 73, PCB; 74, first transmission line; 74, second transmission line; 76, control button; and 77, insulating tube.

DETAILED DESCRIPTION

The disclosure is described in detail below in conjunction with FIGS. 1-8.

The disclosure provides an LED string light with a branch-trunk structure, including a power supply assembly 1 and multiple wire groups 2. A light source assembly 3 is arranged between every two wire groups 2, and one end of the first wire group 2 is electrically connected to the power supply assembly 1; every two wire groups 2 are at least partially bent and combined to form a branch-trunk structure 3 used for supporting the light source assembly 3, for example, every two adjacent wire groups are partially intertwisted to form a braided shape. The LED string light further may include an insulating sleeve 5. At least part of the insulating sleeve 5 is disposed around the branch-trunk structure 4. The light source assembly 3 may include a columnar transparent light bead 31, a first pin 32, a second pin 33 and an LED light source 35 packaged in the columnar transparent light bead 31. The columnar transparent light bead 31 may be shaped like a cylinder, a square column or even a polygon column, and the first pin and the second pin are arranged at a same end of the columnar transparent light bead 31 and electrically connected to the LED light source 35. Each wire group 2 is at least provided with a wire a 21 and a wire b 22 which are arranged abreast, the wire a 21 and the wire b 22 are provided with insulating protection layers 23, at least one end of the wire a 21 is connected to the first pin 32, and at least one end of the wire b 22 is connected to the second pin 33.

The disclosure has the following advantages: 1, the structure of the string light wire of existing string lights is improved, a traditional conductive wire formed by a plurality of copper wires and insulating layers wrapping around the copper wires is replaced with a conductive wire formed by a single metal wire, and the number of wires is reduced, such that the structure of the string light wire is effectively simplified, the size and weight of the string light are reduced, and string light wire is more high-end and attractive, and the decoration effect of the string light is effectively improved; 2, the string light in this technical solution is small in overall size, low in weight, easier to install, and low in manufacturing cost; 3, the string light wire is formed by intertwining two wires which are arranged abreast, and many branches are arranged to form a tree shape, such that the string light is novel and simple in overall structure.

Figure 7:
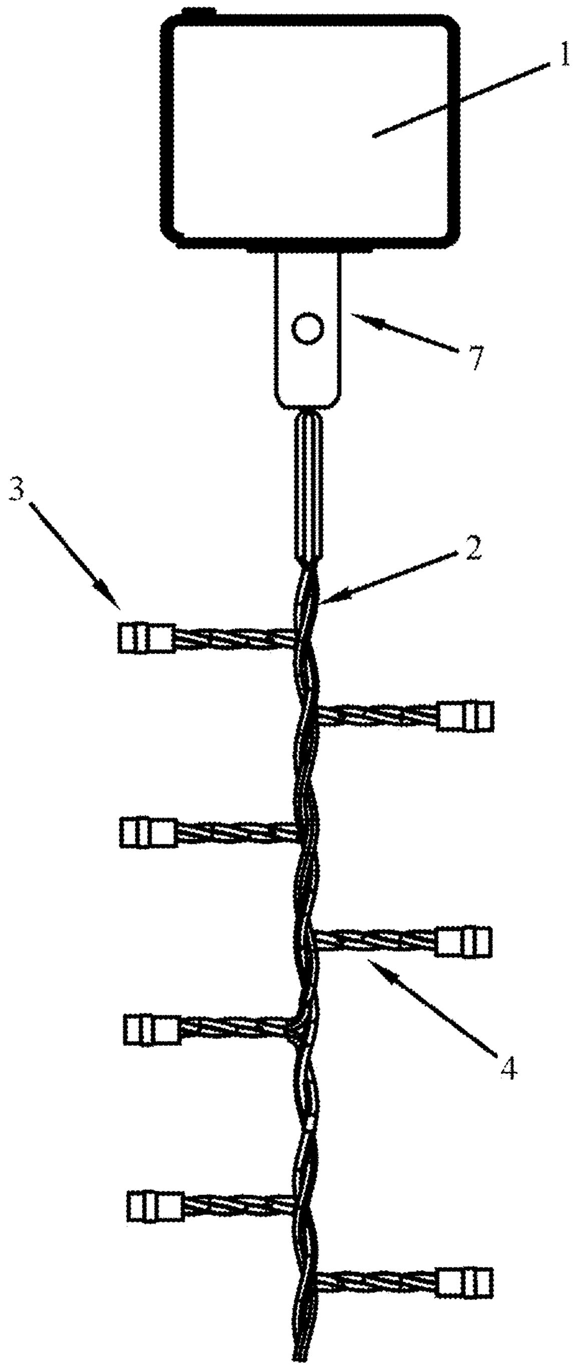
FIG. 7 is a schematic structural view of the power supply assembly according to another embodiment of the disclosure.
Figure 8:
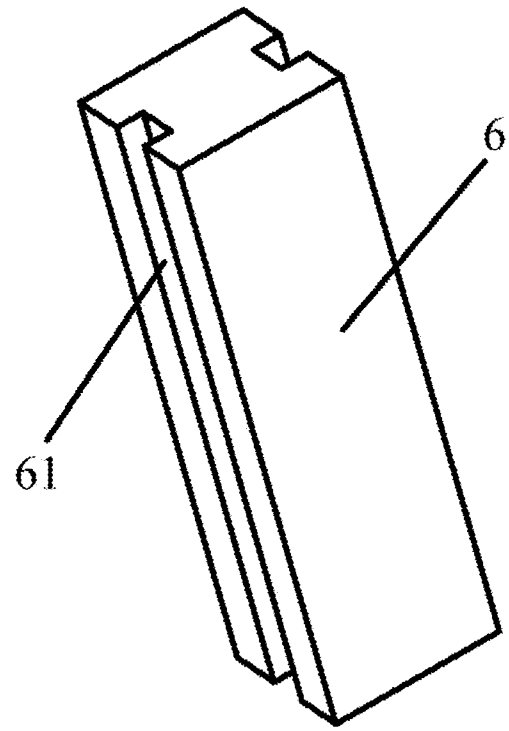
FIG. 8 is a schematic structural view of a support member according to the disclosure.

According to an embodiment of the disclosure, the power supply assembly 1 is a connector used for connecting the string light to a power supply. As shown in FIG. 1, the string light is electrically connected to an external power supply by means of the connector. In another embodiment, the power supply assembly 1 is a battery case. As shown in FIG. 7, a battery is installed in the battery case and may be directly used as a power supply of the string light, such that the string light no longer needs to be connected to an external power supply.

In this technical solution, the wires a 21 in the wire groups are connected, and the wires b 22 in the wire groups are connected, that is, the wire groups 2 may be directly formed by two long wires which are arranged abreast. Because the wire a 21 in each wire group 2 needs to be electrically connected to the first pin 32, and the wire b 22 in each wire group 2 needs to be electrically connected to the second pin 33, such a structure allows two adjacent wires a 21 or b 22 to be electrically connected to the corresponding pin without being cut, thus simplifying the manufacturing process of the string light.

In one embodiment, a part of the insulating sleeve 5 is disposed around the bottom of the columnar transparent light bead 31. The part, disposed around the branch-trunk structure 4, of the insulating sleeve 5, covers a weld joint between the branch-trunk structure 4 and the light source assembly 3 and is mainly used for insulation. The part, disposed around the columnar transparent light bead 31, of the insulating sleeve 5 may position and fix the columnar transparent light bead 31. The insulating sleeve 5 in this technical solution may be a heat shrinkable tube that shrinks when heated. In the actual manufacturing process, when one end of the wire a 21 is welded to the first pin 32 and one end of the wire b 22 is welded to the second pin 33, the insulating sleeve 5 is directly disposed around the columnar transparent light bead 31 to cover weld joints, and then hot air is blown to the insulating sleeve 5 to allow the heat shrinkable tube to shrink quickly to insulate and seal the weld joints, such that quick manufacturing may be realized, and the forming speed is extremely high.

Figure 5:
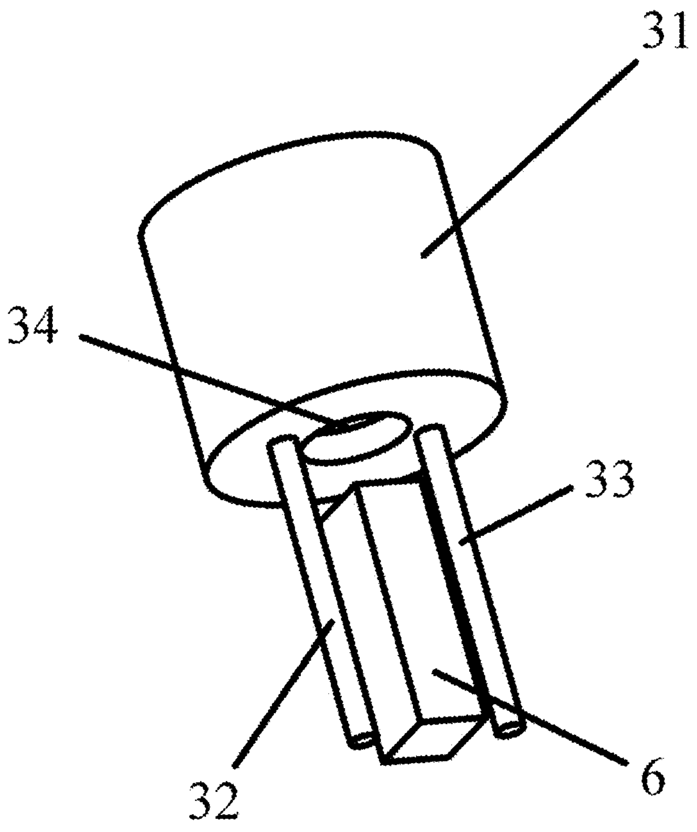
FIG. 5 is an exploded structural view of a light source assembly according to the disclosure.
Figure 6:
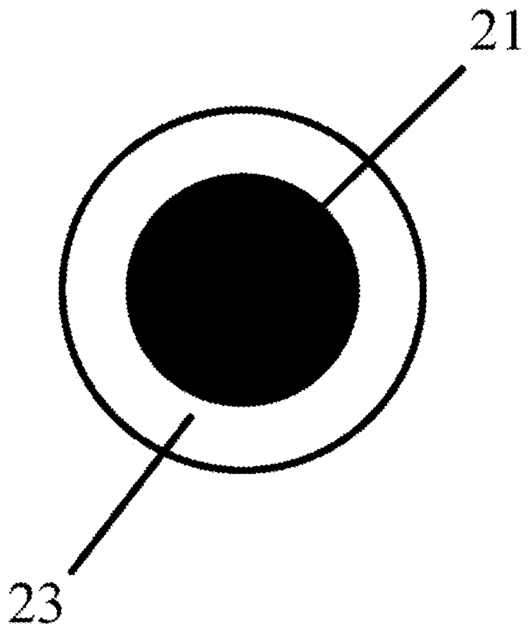
FIG. 6 is a cross-sectional structural view of a wire according to the disclosure.

Optionally, as shown in FIG. 5, to complete welding of the two pins more smoothly, the LED string light may further include a support member 6 installed between the first pin 32 and the second pin 33. The support member 6 may space the first pin 32 apart from the second pin 33, such that a short circuit caused by contact between the two pins is prevented. In addition, the support member 6 may support the columnar transparent light bead 31.

Receiving grooves 61 for receiving the pins are formed in two sides of the support member 6 respectively, such that the columnar transparent light bead 31 may be installed more firmly.

To better position the support member 6 and support the columnar transparent light bead 31, a recess 34 is formed in a bottom end of the columnar transparent light bead 31, and a top end of the support member 6 is mounted in the recess 34.

In another embodiment, to simplify the forming process of the string light, the support member 6 and the columnar transparent light bead 31 may be formed integrally, such that the assembly step of the support member 6 is omitted.

In this technical solution, the wire a 21 and the wire b 22 are intertwisted to form a strand. By adopting such a structure, the wire a 21 and the wire b 22 are arranged integrally and are not separated from each other, such that the string light is unlikely to be damaged in use. In addition, the wire a 21 and the wire b 22 are intertwisted to be similar to a vine in shape, such that the aesthetic of the string light is improved; when the string light is used for decorating an outdoor tree, the string light may be better integrated with the tree to fulfill a better decoration effect.

Optionally, to realize intelligent control of the string light, the string light may further include a controller 7. The controller 7 is arranged between the power supply assembly 1 and the wire groups 2.

Figure 2:
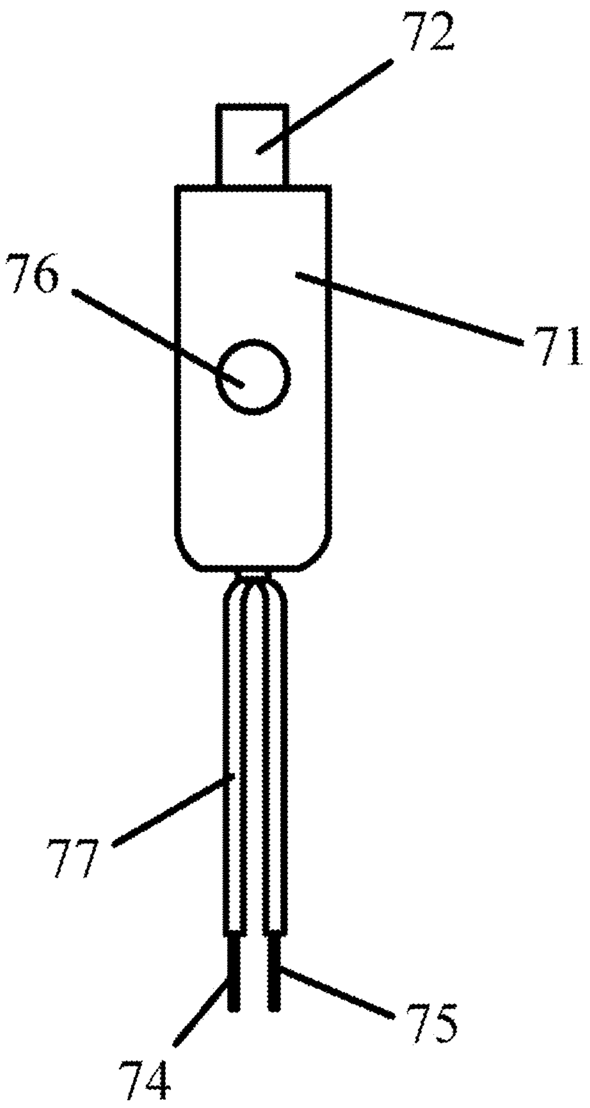
FIG. 2 is an overall structural view of a controller according to the disclosure.
Figure 3:
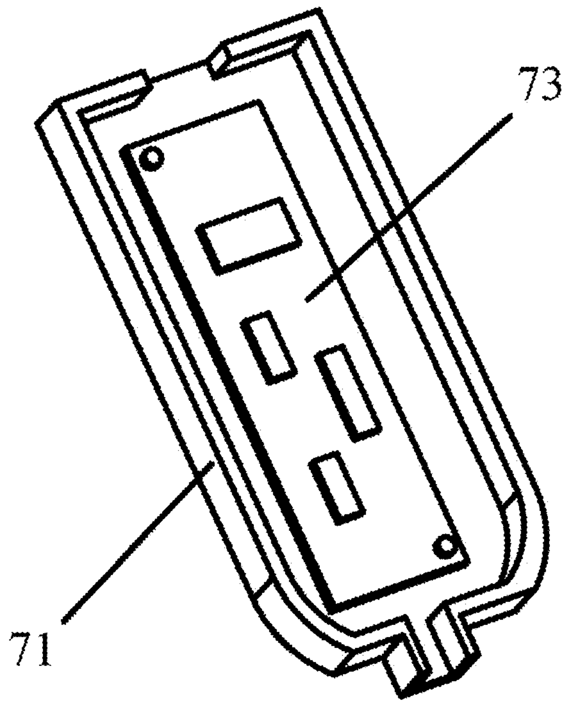
FIG. 3 is an internal structural view of a shell of a power supply assembly according to the disclosure.
Figure 4:
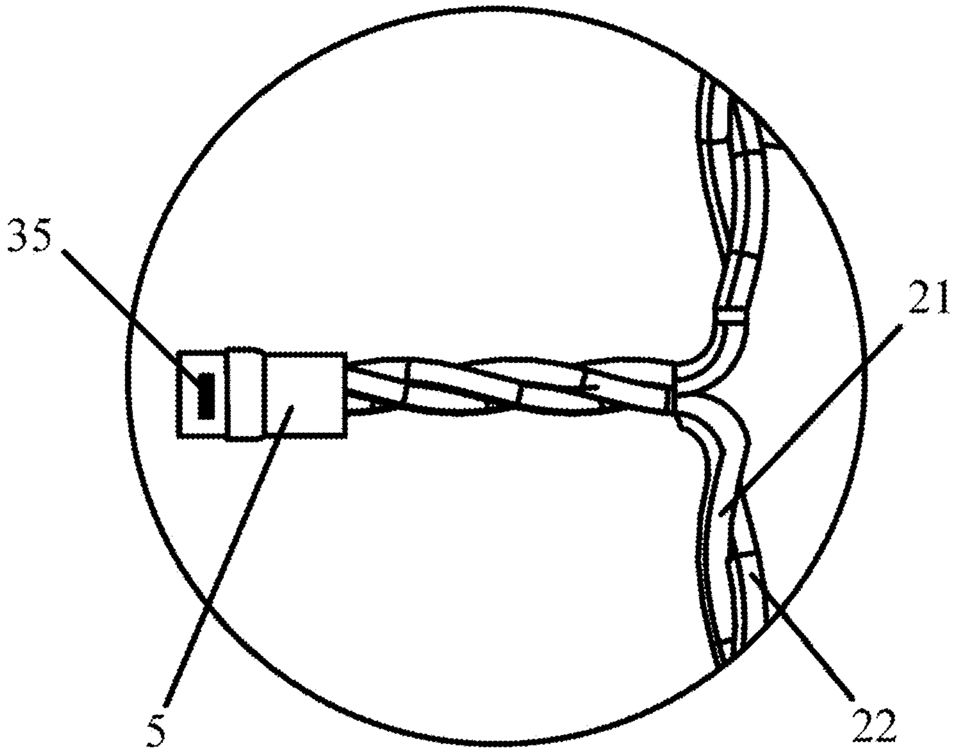
FIG. 4 is a partial enlarged structural view of a wire group according to the disclosure.

As shown in FIG. 2, the controller 7 may include a shell 71, a USB interface 72 and a PCB 73. The PCB 73 is arranged inside the shell 71; the USB interface 72 is arranged at one end of the shell 71 and electrically connected to the PCB 73; the controller 7 is pluggably connected to the power supply assembly 1 by means of the USB interface 72, such that the USB interface 72 is detachably connected to the power supply assembly 1. In a case where an external power supply is only provided with a USB socket, the controller 7 may also function as the power supply assembly 1, thus expanding the application range of the string light.

In another embodiment, a first transmission line 74 and a second transmission line 75 extending outwards are arranged at the other end, away from the USB interface 72, of the shell 71. One end of the first transmission line 74 and one end of the second transmission line 75 are electrically connected to the PCB 73, the other end of the first transmission line 74 is electrically connected to the wire a 21, and the other end of the second transmission line 75 is electrically connected to the wire b 22. Here, electrical connection may be realized by welding. A control button 76 is arranged on the shell 71 and electrically connected to the PCB 73. In use, when the control button is pressed, signals are sent to the string light by the transmission lines to control the string light to be switched to different light modes to satisfy more decoration requirements of users.

Optionally, insulation tubes 77 are disposed around the first transmission line 74 and the second transmission line 75. The insulation tubes 77 are used for isolating the transmission lines from the external environment to prevent current from leaking and may also protect the transmission lines and prolong the service life of the transmission lines. In addition, the insulation tubes 77 may directly cover a weld joint between each transmission line and the wire a 21 or b 22 to fulfill an insulation effect, such that subsequent welding of an insulating cover at the weld joint or subsequent coating of an insulating layer at the weld joint is eliminated.

The above embodiments are preferred ones of the disclosure. For those ordinarily skilled in the art, transformations may be made to the specific embodiments and application scope of the disclosure according to the concept of the disclosure, and the description here should not be construed as features of the disclosure.

What is claimed is:

1. An LED string light with a branch-trunk structure, comprising a power supply assembly (1) and a controller (7), wherein:

the LED string light further comprises multiple wire groups (2), a light source assembly (3) is arranged between every two said wire groups (2), and an end of a first wire group (2) is electrically connected to the power supply assembly (1);

every two said wire groups (2) are at least partially bent and combined to form a branch-trunk structure (4), wherein every two adjacent wire groups (2) are partially intertwisted into a braided shape that supports the light source assembly (3);

the LED string light further comprises an insulating sleeve (5), and at least part of the insulating sleeve (5) is disposed around the branch-trunk structure (4);

the light source assembly (3) comprises a columnar transparent light bead (31), a first pin (32), a second pin (33) and an LED light source (35) packaged in the columnar transparent light bead (31), and the first pin (32) and the second pin (33) are arranged at a same end of the columnar transparent light bead (31) and electrically connected to the LED light source (35); and each said wire group (2) is at least provided with a wire a (21) and a wire b (22) which are arranged abreast, the wire a (21) and the wire b (22) are provided with insulating protection layers (23), at least one end of the wire a (21) is connected to the first pin (32), and at least one end of the wire b (22) is connected to the second pin (33);

the controller (7) comprises a shell (71) and a PCB (73), and the PCB (73) is arranged inside the shell (71); the controller (7) is connected to the power supply assembly (1);

one end of the first transmission line (74) and one end of the second transmission line (75) are electrically connected to the PCB (73), the other end of the first transmission line (74) is electrically connected to the wire a (21), and the other end of the second transmission line (75) is electrically connected to the wire b (22).

2. The LED string light with a branch-trunk structure according to claim 1, wherein a part of the insulating sleeve (5) is disposed around a bottom of the columnar transparent light bead (31).

3. The LED string light with a branch-trunk structure according to claim 1, further comprising a support member (6), wherein the support member (6) is mounted between the first pin (32) and the second pin (33).

4. The LED string light with a branch-trunk structure according to claim 3, wherein a recess (34) is formed in a bottom end of the columnar transparent light bead (31), and a top end of the support member (6) is mounted in the recess (34).

5. The LED string light with a branch-trunk structure according to claim 1, wherein a support member (6) is arranged on the columnar transparent light bead (31), and the support member (6) and the columnar transparent light bead (31) are formed integrally.

6. The LED string light with a branch-trunk structure according to claim 1, wherein another portion of the wire a (21) and another portion of the wire b (22) are intertwisted to form a trunk of the branch-trunk structure.

7. The LED string light with a branch-trunk structure according to claim 1, wherein the controller (7) is arranged between the power supply assembly (1) and wire groups (2).

8. The LED string light with a branch-trunk structure according to claim 1, wherein insulation tubes (77) are disposed around the first transmission line (74) and the second transmission line (75).

9. The LED string light with a branch-trunk structure according to claim 1, the power supply assembly (1) is a connector or battery case.

* * * * *